Jan. 17, 1939.    R. THOMAS    2,144,443
LAGGING CLUTCH PULLEY STRUCTURE
Original Filed June 17, 1935
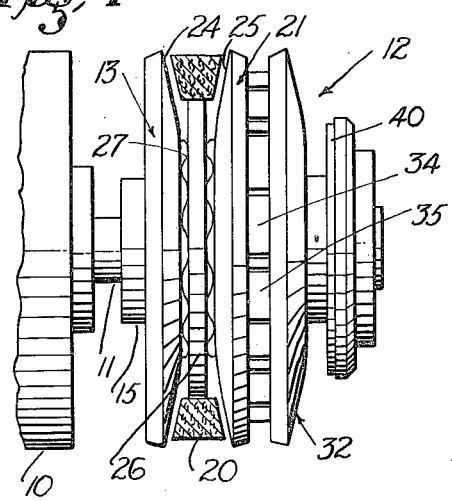
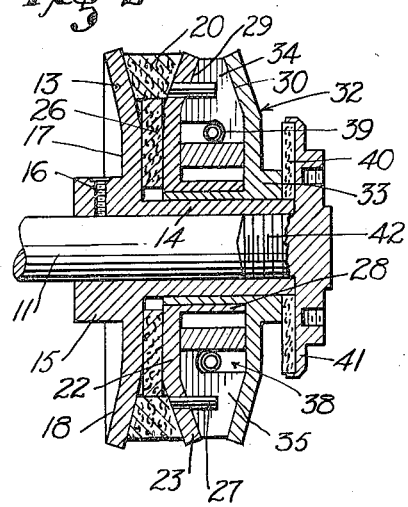
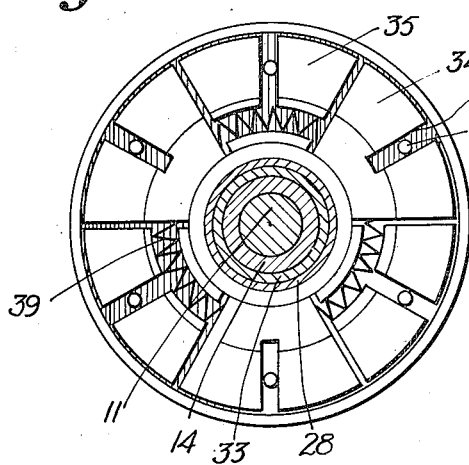
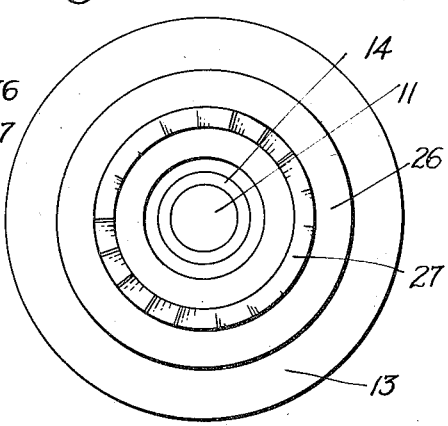
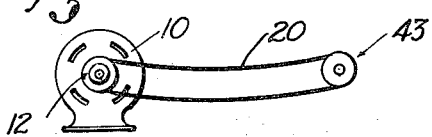
INVENTOR
RAY THOMAS
BY
James M. Abbott
ATTORNEY Patented Jan. 17, 1939

2,144,443

UNITED STATES PATENT OFFICE 2,144,443

LAGGING CLUTCH PULLEY STRUCTURE

Ray Thomas, Los Angeles, Calif.

Application June 17, 1935, Serial No. 26,907
Renewed June 13, 1938

9 Claims. (Cl. 74—230.24)

This invention relates to power transmission means and particularly pertains to a lagging clutch pulley structure.

In the operation of various kinds of machinery, particularly those which are directly driven by a prime mover, it is desirable that the application of power be gradually applied so that undue shock and strain will not be imposed upon the prime mover, such for example as an electric motor, and so that the driven device will be supplied with gradually increasing power as it is driven in an accelerating motion to its normal speed. It is the principal object of the present invention therefor to provide a lagging clutch pulley structure adapted to be especially useful when applied to electric motors and the like, and for driving driven structures through a belt and pulley transmission mechanism in a manner to insure that the application of power from the driving structure to the driven structure will be gradual and will be automatically accelerated by the action of an interposed clutch mechanism.

The present invention contemplates the provision of a centrifugally actuated clutch structure, such for example as that generally indicated in Patent No. 1,669,507, issued to James T. Dickson, May 15, 1928, and entitled Prime movers and clutches, and in which a driven clutch member and a driving clutch member are placed in driving relation to each other by centrifugally operated means, the clutch in the present instance acting to increase the frictional engagement between the faces of a pulley and a belt circumscribing the same due to the centrifugal action of the clutch.

The invention is illustrated by way of example in the accompanying drawing in which:

Figure 1 is a view in side elevation showing a clutch and pulley structure embodying the features of the present invention.

Fig. 2 is a view in central vertical section showing the clutch and the pulley structure when set.

Fig. 3 is a view in section and elevation as seen on the line 3—3 of Fig. 2 and as showing the centrifugally operated clutch elements.

Fig. 4 is a view in elevation showing the spring means applied to the belt supporting washer.

Fig. 5 is a view in diagram indicating the manner in which the prime mover and the driven member are connected by a loosely disposed driving belt.

Referring more particularly to the drawing, 10 indicates a prime mover, such for example as an electric motor, which is fitted with an armature shaft 11 carrying a pulley and clutch structure 12 with which the present invention is concerned. Mounted upon the shaft 11 is a flanged pulley disc 13. This disc has a central tubular hub 14 into which the shaft 11 fits, the outer portion 15 of the hub carrying a set screw 16 by which the hub is secured to the motor shaft 11. The pulley disc 13 has a central annular portion 17 lying at right angles to the axis of the shaft and an outwardly flaring flange 18 which is disposed at an angle to the disc portion 17, and frictionally engages a driving belt 20 of substantially triangular cross section, in a manner which will be hereinafter described. Complementary to the pulley disc 13 is a flanged pulley disc 21 having a central disc-shaped portion 22 and an outwardly flaring flanged portion 23. It will be noted that the pulley discs 13 and 21 thus provide a substantially V-shaped throat into which the belt 20 may wedge when in engagement with the inclined faces 24 and 25 of the pulley discs 13 and 21 respectively. Normally the space between the discs 13 and 21 is greater than the width of the belt and will thus not engage therewith, and at which time the belt rides upon a washer 26, here shown as made of pressed Bakelite. The washer in its face carries a plurality of marcelled spring rings 27 which are partially embedded in the faces and act normally to hold the faces 24 and 25 of the discs 13 and 21 out of engagement with the belt 20. The pulley disc 21 is provided with a tubular hub 28 by which the disc is slidably mounted upon the tubular hub 14 of the pulley disc 13. It will be seen that the pulley disc 21 is formed with the convexed face 25 on one of its sides and a concaved face 29 upon its opposite side. This face is inclined outwardly from the periphery of the disc 21 and is complementary to an oppositely inclined concaved face 30 formed upon a clutch disc 32. The clutch disc 32 is provided with a tubular hub 33 which telescopes over the hub 28 of the disc 21. Interposed between the discs 21 and 32 is a plurality of clutch segments 34 and 35. As shown in Fig. 3 of the drawing there are three each of these segments alternately disposed and arranged around the hub 33. Each of the segments is formed with a radial slot 36 to receive a pin 37. A plurality of these pins are equally spaced around the face 32 and project inwardly parallel to the longitudinal axis of the structure. Each of the segments is also formed with an arcuate slot 38. However, the segments 34 are disposed with the arcuate slot faced toward the face 30 of disc 32, and the segments 35 are disposed with their arcuate slots faced toward the disc 21. Mounted within the arcuate slots which lie in circular continuation of each other is a coil spring 39 by which all of the segments 34 and 35 are held normally in seated positions around the hub 33 of the disc 32. Centrifugal action set up by rotation of the clutch structure will tend to stretch the spring 39 which is an annular endless spring and will yieldably permit the clutch segments 34 and 35 to move outwardly against the faces 30 and 29 of the discs 21 and 32, respectively. Attention is directed to the fact that the outer portions of each of the segments is tapered to present inclined faces complementary to the disc faces 29 and 30. Mounted upon the projecting end portion of the hub 28 of clutch disc 21 are friction washers 40 which are carried within a cup 41 secured to the end of the hub 14 of the pulley disc 13 by a central square portion 42. The washers 40 make it possible to control the degree of friction existing between the discs 21 and 32, and also act as a cushion member for the discs 21 and 32 as they slide.

In operation of the present invention the device is assembled as particularly shown in Fig. 1 of the drawing, and may be applied to a shaft 11 of a prime mover 10, such as an electric motor. When so installed the screw 16 is set to hold the hub 14 of the pulley disc 13 in fixed relation to the shaft. The belt 20 is then led around and between the discs 13 and 21 of the clutch structure 12 and also around a driven pulley 43. Attention is directed to the fact that as shown in Fig. 5 of the drawing the belt 20 is loosely led around the pulleys so that there will be a certain amount of slack which must be taken up in the belt before the structure 12 drives a pulley 43. This action causes a lag in the movement of the clutch structure 12 with relation to the pulley 43. When the prime mover begins rotation of the shaft 11 the discs 13 and 21 will be separated a distance from each other due to the expansive action of the springs 27. At this time the faces 24 and 25 of the discs will be out of driving contact with the side faces of the belt 20 and the belt will ride upon the washer 26. As the speed of the shaft 11 accelerates the weighted segments 34 and 35 will move radially between the convexed faces of the discs 21 and 32. This will act to move the segments outwardly to spread or separate the discs 21 and 32 by forcing the disc 21 toward the disc 13 against the resistance of springs 27 and the annular coil spring 39. As the segments move outwardly they will be guided by the pins 37 riding in the slots 36 and will act to move the disc 21 longitudinally of the shaft 11, and will thus reduce the width of the inclined throat between the faces 24 and 25 of the discs 13 and 21 and will gradually increase the frictional engagement of these faces with the tri-angular belt 20.

It will thus be seen that by this arrangement of the particular clutch 12 and the pulley 43 operating in conjunction with the belt 20 it is possible to gradually build up the load being carried by the prime mover and to insure that a gradual acceleration of rotation of the pulley 43 will be brought about without imposing a full load upon the motor when the driving operation is initiated.

While I have shown the preferred form of my invention, as now known to me, it will be understood that various changes might be made in the combination, construction, and arrangement of parts by those skilled in the art without departing from the spirit of the invention as claimed.

Having thus described my invention, what I claim and desire to secure by Letters Patent is:

1. In combination with a prime mover having a rotary drive shaft, a pulley structure including complementary flange members mounted upon said shaft, one fixed thereto, and the other movable thereon, and between the faces of which a belt is adapted to seat, a third convex disc complementary to the freely movable disc mounted upon the shaft adjacent the freely movable disc, and centrifugal means disposed between the freely movable pulley disc and the third mentioned convex disc and acting upon the movable pulley member to force it toward the fixed pulley member and thereby increase the driving friction between the pulley structure and the belt thereon after the rotary drive shaft has reached a minimum speed and then in direct response to the acceleration in speed of rotation of the shaft.

2. In combination with a drive shaft, a pulley disc having a convexed conical face, said disc being fixed to rotate with the shaft, a pulley disc having an oppositely inclined convexed face freely rotatable upon the shaft and longitudinally shiftable, an intermediate member disposed between said discs and freely rotatable with relation to the shaft, and the two discs, said intermediate member supporting a driving belt of triangular section out of engagement with the concaved faces of the two discs under normal conditions, and centrifugally operating means mounted upon the shaft and acting on rotation thereof to gradually bring the inclined faces of the belt into frictional driving engagement with the convexed faces of the discs, said centrifugal means comprising a plurality of radial and outwardly moving wedges, a disc fixed against longitudinal movement disposed on the opposed side of said wedges from the movable pulley disc whereby the movable pulley disc will be shifted toward the fixed pulley disc as the wedge members move outwardly.

3. In combination with a drive shaft, a pulley disc having a convexed conical face, said disc being fixed to rotate with the shaft, a pulley disc having an oppositely inclined convexed face freely rotatable upon the shaft and longitudinally shiftable, an intermediate member disposed between said discs and freely rotatable with relation to the shaft, and the two discs, said intermediate member supporting a driving belt of triangular section out of engagement with the concaved faces of the two discs under normal conditions, centrifugally operating means mounted upon the shaft and acting on rotation thereof to gradually bring the inclined faces of the belt into frictional driving engagement with the convexed faces of the discs, said centrifugal means comprising a plurality of radial and outwardly moving wedges, a disc fixed against longitudinal movement disposed on the opposite side of said wedges from the movable pulley disc whereby the movable pulley disc will be shifted toward the fixed pulley disc as the wedge members move outwardly, and yieldable means acting to restrain the wedge members from their outward movement.

4. In combination with a drive shaft a convexed pulley disc fixed upon said shaft, an oppositely disposed convexed pulley disc freely rotatable upon the shaft and longitudinally movable whereby the opposite sides of a belt may be frictionally gripped as the discs move together, said convexed pulley disc being formed with an opposite concaved face, a concaved disc freely rotatable upon the shaft and held against longitudinal movement, and weight members disposed between the concaved face of said concaved disc and said movable pulley disc whereby their outward movement will force the movable pulley disc toward the fixed pulley disc and produce a gripping action upon the pulley belt disposed therebetween.

5. In combination with a drive shaft a convexed pulley disc fixed upon said shaft, an oppositely disposed convexed pulley disc freely rotatable upon the shaft and longitudinally movable whereby the opposite sides of a belt may be frictionally gripped as the discs move together, said convexed pulley disc being formed with an opposite concaved face, a concaved disc freely rotatable upon the shaft and held against longitudinal movement, weight members disposed between the concaved face of said concaved disc and said movable pulley disc whereby their outward movement will force the movable pulley disc toward the fixed pulley disc and produce a gripping action upon the pulley belt disposed therebetween, and means yieldably holding the pulley discs in separation.

6. In combination with a drive shaft a convexed pulley disc fixed upon said shaft, an oppositely disposed convexed pulley disc freely rotatable upon the shaft and longitudinally movable whereby the opposite sides of a belt may be frictionally gripped as the discs move together, said convexed pulley disc being formed with an opposite concaved face, a concaved disc freely rotatable upon the shaft and held against longitudinal movement, weight members disposed between the concaved face of said concaved disc and said movable pulley disc whereby their outward movement will force the movable pulley disc toward the fixed pulley disc and produce a gripping action upon the pulley belt disposed therebetween, and yieldable means tending to restore the weighted members to their inoperative positions.

7. In combination with a drive shaft a convexed pulley disc fixed upon said shaft, an oppositely disposed convexed pulley disc freely rotatable upon the shaft and longitudinally movable whereby the opposite sides of a belt may be frictionally gripped as the discs move together, said convexed pulley disc being formed with an opposite concaved face, a concaved disc freely rotatable upon the shaft and held against longitudinal movement, weight members disposed between the concaved face of said concaved disc and said movable pulley disc whereby their outward movement will force the movable pulley disc toward the fixed pulley disc and produce a gripping action upon the pulley belt disposed therebetween, and friction means between the drive shaft and the concaved disc whereby driving engagement between the shaft and the disc will be increased as the weight members move outwardly.

8. In combination with a drive shaft a convexed pulley disc fixed upon said shaft, an oppositely disposed convexed pulley disc freely rotatable upon the shaft and longitudinally movable whereby the opposite sides of a belt may be frictionally gripped as the discs move together, said convexed pulley disc being formed with an opposite concaved face, a concaved disc freely rotatable upon the shaft and held against longitudinal movement, weight members disposed between the concaved face of said concaved disc and said movable pulley disc whereby their outward movement will force the movable pulley disc toward the fixed pulley disc and produce a gripping action upon the pulley belt disposed therebetween, and means positively guiding the weight members along paths radially to the axis of rotation of the shaft.

9. In combination with a drive shaft, a convex pulley disc fixed upon said shaft, an oppositely disposed convexed pulley disc freely rotatable upon the shaft and longitudinally movable thereon, a belt, said belt being led between the two convex faces of the pulley discs, a third disc complementary to the second mentioned disc freely movable upon the shaft and mounted adjacent the second mentioned disc, centrifugally operated means acting to move the second mentioned disc to increase the friction between the pulley disc, the second mentioned disc and the belt as the speed of the shaft is increased.

RAY THOMAS.